April 19, 1960  J. B. LONG  2,933,177
BELT HANDLING APPARATUS

Filed March 16, 1959  3 Sheets-Sheet 1

INVENTOR
JOHN B. LONG

BY Rommel, Allwine & Rommel

ATTORNEYS

April 19, 1960 J. B. LONG 2,933,177
BELT HANDLING APPARATUS
Filed March 16, 1959 3 Sheets-Sheet 2
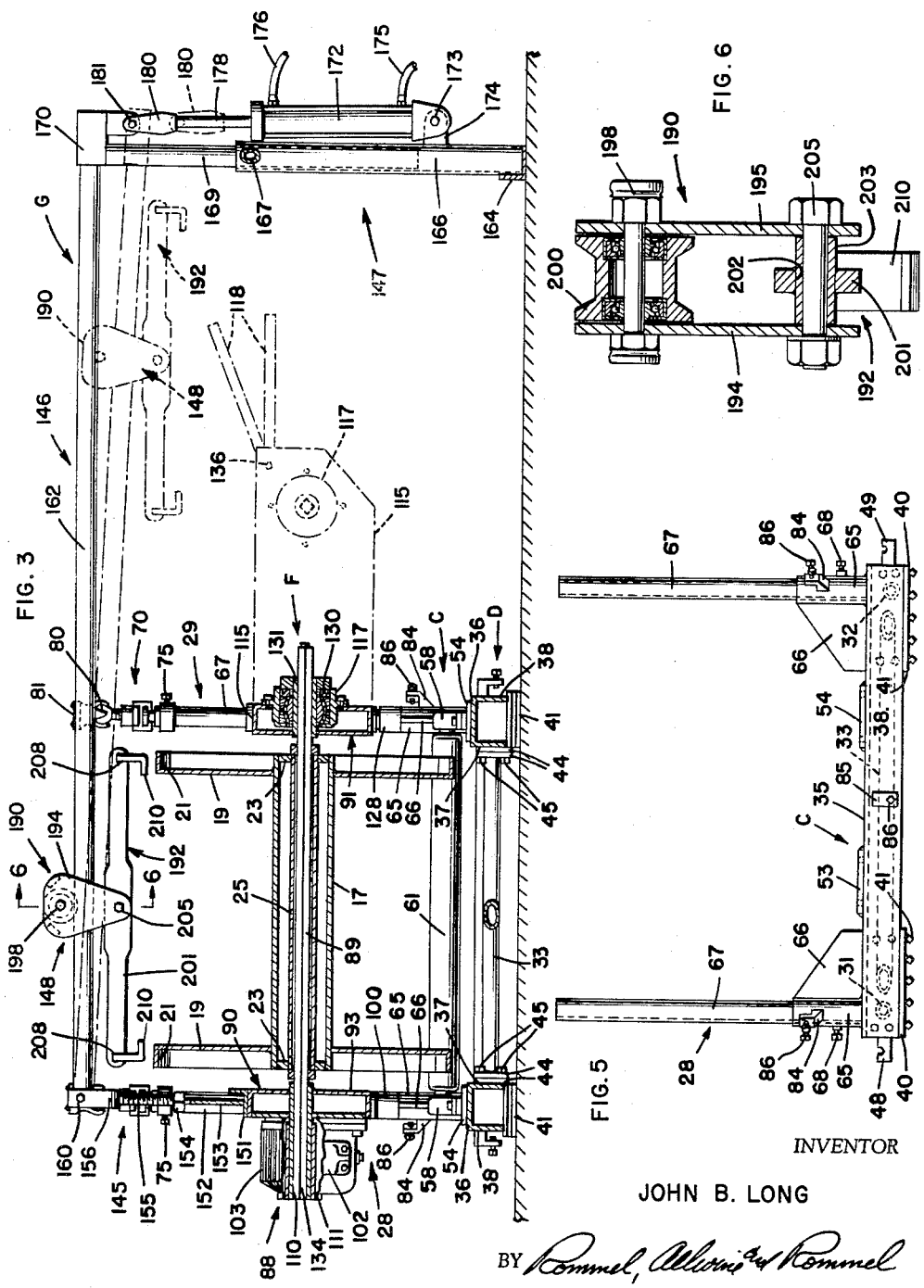
INVENTOR
JOHN B. LONG
ATTORNEYS April 19, 1960
J. B. LONG
2,933,177
BELT HANDLING APPARATUS
Filed March 16, 1959
3 Sheets-Sheet 3
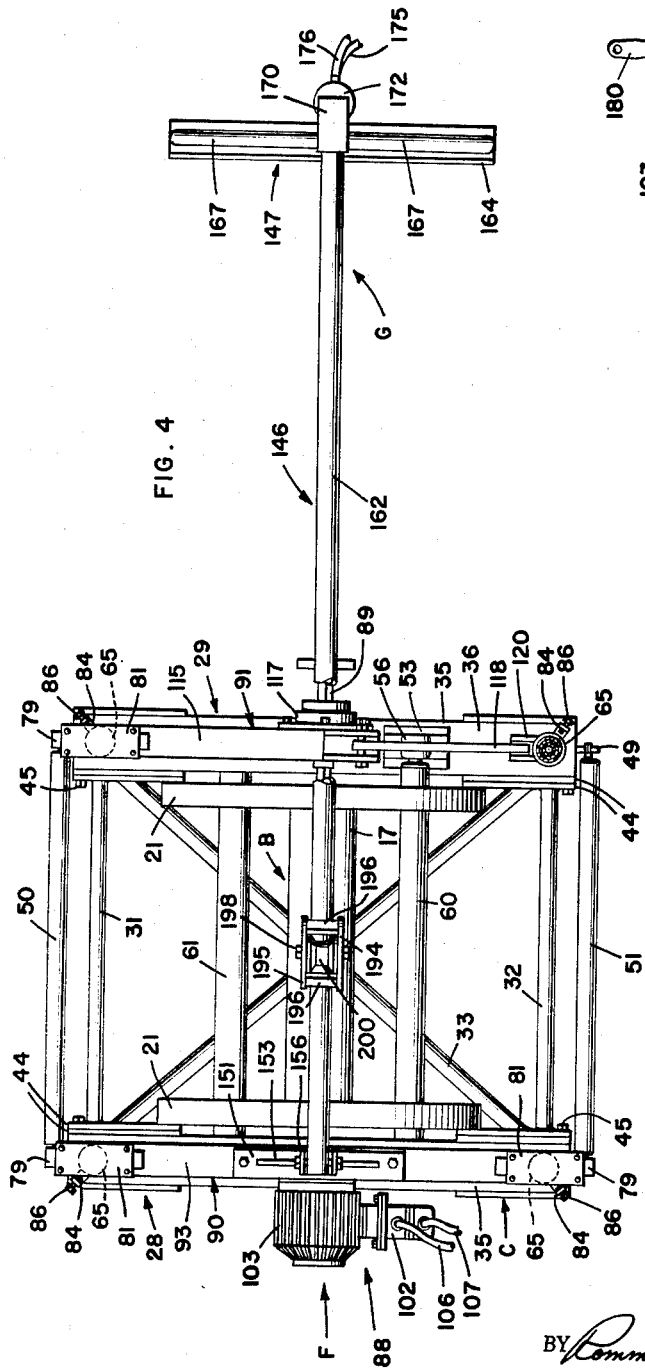
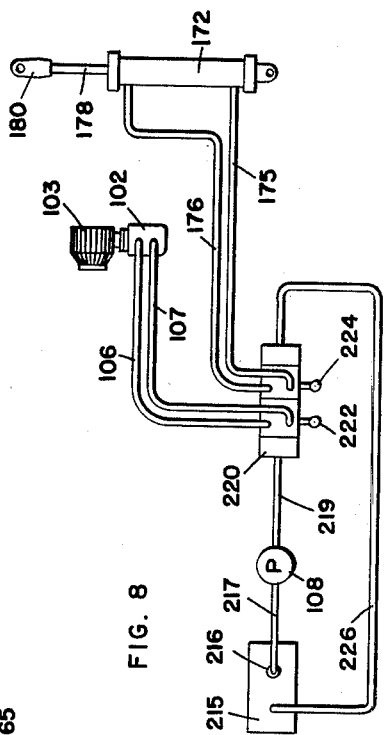
INVENTOR
JOHN B. LONG
ATTORNEYS United States Patent Office 2,933,177
Patented Apr. 19, 1960

2,933,177

BELT HANDLING APPARATUS

John B. Long, Oak Hill, W. Va., assignor to The Long Company, Oak Hill, W. Va., a corporation of West Virginia Application March 16, 1959, Serial No. 799,771

15 Claims. (Cl. 198—139)

This invention relates to improvements in belt handling apparatus and particularly to apparatus for the insertion and removal of belting in an extensible endless belt conveyor.

In the positioning and addition or removal of lengths of belting to an extensible endless belt conveyor it has long been a problem to manipulate the exceptionally heavy reels of belting into position so that the length of belting contained on the reel can be properly added to the belt conveyor as it is extended and to rewind and manipulate a length of belting that is removed from the belt conveyor when the conveyor is retracted.

The primary object of my invention is the provision of improved belt handling apparatus whereby reels of belting may be manipulated with facility in the addition or removal of lengths of belting to an extensible endless belt conveyor.

A further object is the provision of belt handling apparatus that has a minimum of movable parts and is extremely compact, so that the same may be used in places wherein there is a likelihood of an accumulation of abrasive dust and dirt, such as in coal mines, and wherein there is a minimum of space within which the apparatus can be erected and the reels of belting manipulated, such as in low ceiling mines.

A further object is the provision of belt handling apparatus that may be positioned with respect to the belt conveyor so that when the same is used in a confined area the belting can be applied from either one side of the belt conveyor or the other, as space permits.

A further object is the provision of belt handling apparatus for use in association with belt conveyors of the type disclosed in copending application Serial No. 700,444, filed December 3, 1957, now Patent No. 2,896,774, of which Jeff C. Clay and myself are joint inventors, wherein the conveying roller units supporting the conveying reach of the belt are supported upon a pair of spaced parallel flexible strands. In this type of belt conveyor there arises the problem of properly positioning the belting between the pair of spaced flexible strands and manipulation of the reels of belting to a position intermediate the pair of spaced flexible strands without interference with the strands. When my belt handling apparatus is utilized with such a belt conveyor, the same is preferably situated at a location in the belt conveyor wherein access may be easily had for the addition or the removal of belting, and the flexible strands are secured to the apparatus in such a manner as to properly position the reels of belting in longitudinal alignment with the conveyor and the flexible side strands are positioned so that there will be no danger of interference therewith by the reels of belting.

Other objects and advantages of the invention will be apparent during the course of the following detailed description, taken in connection with the accompanying drawings, forming a portion of this specification and in which drawings:

Fig. 3 is a front plan view of my improved belt handling apparatus, with parts thereof broken away to disclose the preferred details.

Fig. 4 is a top plan view of my improved belt handling apparatus, with parts thereof broken away to disclose the preferred details.

Fig. 5 is a side view of the frame of my improved belt handling apparatus.

Fig. 6 is an enlarged vertical sectional view taken substantially on the 6—6 of Fig. 3.

Fig. 8 is a diagrammatic view showing a preferred hydraulic system for the operation of my improved belt handling apparatus.

Figure 1:
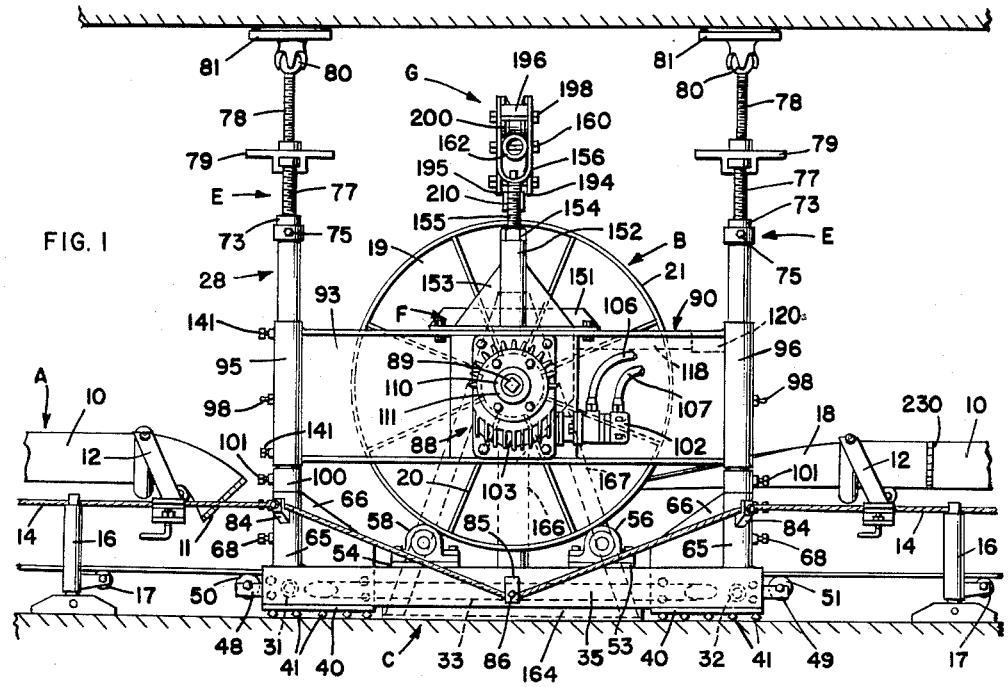
Fig. 1 is a side view of my improved belt handling apparatus, showing the same positioned for the addition or removal of belting to an extensible endless belt conveyor.
Figure 2:
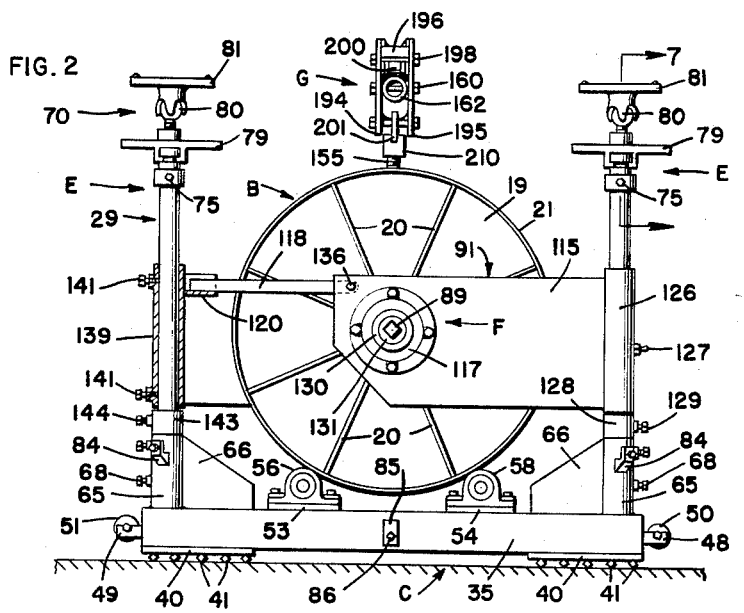
Fig. 2 is a side view of my improved belt handling apparatus taken from the opposite side from Fig. 1, with parts thereof being broken away to show the preferred details.
Figure 7:
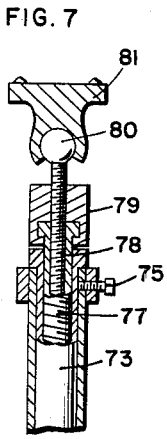
Fig. 7 is an enlarged vertical sectional view taken substantially on the line 7—7 of Fig. 2.

In the drawings, wherein for the purpose of illustration is shown a preferred embodiment of the invention, and wherein similar reference characters designate corresponding parts throughout the several views, the letter A may generally designate an extensible endless belt conveyor; B a storage roll for supporting belting for the belt conveyor A; C a frame for supporting the reel B; D means for positioning the frame C with respect to belt conveyor A for the addition or removal of belting from the belt conveyor A; E means for fixedly securing the frame C in position; F means for rotary support of the reel B upon the frame C; and G means for positioning the reel B with respect to the frame C.

The extensible endless belt conveyor A may be of any preferred type, and in the drawings I have shown a belt conveyor similar to that set forth in the aforesaid application Serial No. 700,444, wherein a belt 10 is orbitally connected as by a splice 11 for endless rotary movement between a head and tail section (not shown), and wherein the conveying reach of the belt is supported upon a plurality of conveying idler roller units 12 supported upon a pair of spaced flexible strands of wire or rope 14. The flexible strands 14 are supported above the ground floor surface by the standards 16, which standards 16 also support return rollers 17 for supporting the return reach of the belt 10.

Belting that is to be added to such belt conveyors is usually supported upon a reel, and I have shown one such type reel B in the drawings. This reel B preferably includes a cylindrical reel drum 17, upon which is wound a length of belting 18 that is held thereon by a pair of disc-like side members 19 supported at either end of the reel drum 17. The disc-like side members 19 may be provided with radially extending braces 20 and I preferably provide a flange portion 21 extending peripherally about each of the discs, for a purpose to be subsequently described. Housed centrally within the cylindrical reel drum 18, and supported therein by end washers 23 is a drive shaft receiving sleeve 25 that extends for the entire length of the reel drum 18 and slightly outwardly therebeyond. This sleeve 25 is preferably of a rectangular cross section and is formed for cooperative engagement with the drive shaft of the means F, as will be subsequently described.

The frame C preferably includes a pair of side members 28 and 29 that are supported in a parallel spaced relationship by the end braces 31 and 32 and the X-shaped cross brace 33. The side frame members 28 and 29 are identical and therefore like reference characters will be applied to corresponding parts of each. The side members 28 and 29 each have a side rail 35 of a substantially rectangular channel construction having an upper side plate 36, an inner side plate 37, and an outer side plate 38, with the lower side thereof being open. Frame supporting base plates 40 are welded across the open lowermost side of the plates 37 and 38, across the open channel, adjacent each end of the side rail 35, and a plurality of gripping lugs or cleats 41 are welded or otherwise transversely secured to the lowermost surface of each base plate. The base plates 40 and the cleats 41 form the ground engaging portions of the frame and the engagement of the cleats 41 with the ground floor prevents longitudinal shifting of the frame. Brace mounting plates 44 may be secured to the inner side plates 37, as by the nuts 45, and the end braces 31 and 32 and the X-shaped cross brace 33 welded or otherwise secured to the brace mounting plates 44.

Secured to either end of the side rails 35 are return roller supporting brackets 48 and 49. The parallel supporting brackets 48 at one end of each of the side members 28 and 29 support a return roller 50 and the parallel supporting brackets 49 at the other end thereof support a return roller 51. These return rollers 50 and 51 support the return reach of the belt 10 as it passes through the frame C.

Spaced pillow block supporting plates 53 and 54 are mounted on the upper plate 36 of each of the side rails 35 and have secured thereto pillow blocks 56 and 58. The parallel pillow blocks 56 secured to the side members 28 and 29 have mounted therebetween a reel supporting roller 60, and the parallel pillow blocks 58 secured to the side members 28 and 29 supports have mounted therebetween a second reel supporting roller 61. These rollers 60 and 61 are spaced apart to rotatably support the reel within the frame C, so that belting may be fed from the reel, as will be subsequently described.

Tubular vertical anchor posts 65 are secured adjacent each end of the side rails 35 and are provided with reinforcing braces 66. These tubular cylindrical anchor posts 65 support vertical end posts 67 secured thereto by means of the set screws 68. These vertical end posts 67 support the roof jacks 70 that cooperate with the base plates 40 and cleats 41 and provide the means E for fixedly securing the frame C in position.

These roof jacks 70 are well known in the art and include a supporting internally threaded tube 73, which tube interfits within the tubular vertical end post 67 and is secured therein by means of a set screw 75. Mounted within the internally threaded tube 73 is a second tube 77 that is both externally and internally threaded, the external threads of the tube 77 cooperating with the internal threads of the tube 73. Mounted within the internally threaded tube 77 is an exteriorly threaded shaft 78, the threads of which engage with the internal threads of the tube 77. A handle 79 is provided for manipulating the threaded portions, thereby raising and lowering the jack, and the uppermost end of the shaft 78 is provided with a universal joint 80 that supports a roof engaging plate 81. It will therefore be seen from Fig. 1, that with the cleats 41 of the frame C engaging the floor surface, and the plate 81 engaging the roof surface, that the frame C will be securely anchored in position.

In the event the apparatus is to be used above ground, or where the ceiling is too high to permit use of roof jacks, any well known means, such as a cable and anchoring stake, may be attached to the frame C for holding the same in position.

The means D is specifically provided for positioning the frame C between the spaced pair of flexible strands of a strand supported belt conveyor. This means D preferably includes rope clips 84 that are angularly secured to the outer side of each of the vertical anchor posts 65, and a central rope clip 85 that is secured centrally of the outer side plate 38 of each of the side rails 35. As will be seen from Fig. 1, the flexible strand is entrained to either side of the frame C, over the rope clips 84 and under the rope clip 85 and is secured within the clips by means of the set screws 86. With this construction the frame C is firmly positioned between the flexible strands and a belt reel received thereon will be in juxtaposition to feed the belting to the belt conveyor.

The means F for the rotary support of the reel B upon the frame C preferably includes drive means 99, a drive shaft 89, a drive means and drive shaft supporting bracket 90 mounted upon the side member 28, and a drive shaft supporting gate bracket 91 mounted upon the side member 29.

The bracket 90 preferably comprises a central web portion 93 that extends longitudinally of the side member 28, above the side rail 35, and is provided at each end thereof with cylindrical sockets 95 and 96 that are slidably mounted upon the vertical end posts 67 adjacent the ends of the side rail 35. The lubricant fittings 98 may be provided upon each of the cylindrical sockets 95 and 96, for lubricating the sliding fit of the cylindrical sockets about the vertical posts. In order to secure the bracket 90 at the proper height above the rollers 60 and 61, clamps 100 are mounted upon each of the vertical posts 67, below each of the cylindrical sockets 95 and 96. These clamps 100 are rings slidably fitted upon the vertical posts 67 and are provided with set screws 101 for locking the rings 100 in the desired position upon the vertical posts 67. The bracket 90 can thus be moved upwardly or downwardly upon the vertical end posts 67 to the desired position and the clamps 100 then moved into abutment with the lowermost end of each of the sockets 95 and 96 and locked in position by tightening the set screws 101. The weight of the bracket 90 and structure mounted thereupon will maintain the sockets 95 and 96 in abutment with their respective clamps 100, thus supporting the bracket 90 at the predetermined height. This height adjustment is necessary as the central web 93 of the mounting bracket 90 supports the drive means and one end of the drive shaft for the reel and, dependent upon the size of reel used, the drive shaft for the reel must be placed at a height in alignment with the axis of the reel.

The drive means 88 is provided for rotating the drum for reeling the belting thereupon when the same is to be removed from the belt conveyor. The drive means 88 is mounted centrally of the web 93 and preferably comprises a hydraulic motor 102 having a gear reducer 103 operably connected thereto. The motor 102 is driven by hydraulic fluid that is pumped through the conduits 106 and 107 from a hydraulic pump 108. A drive sleeve 110 is attached to the rotor 111 of the gear reducer 108 and extends through the mounting web 93 and slightly therebeyond inwardly of the frame C receiving one end of the drive shaft 89.

The gate bracket 91 secured upon the side member 29 preferably includes a swinging side web 115 that is slidably and rotatably mounted upon one of the vertical posts 67 at one end of the side member 29; a bearing member 117 mounted upon the side plate 115; a latch member 118 mounted upon the side plate 115 opposite from the securement thereof to the vertical post 67; and a latch receiving catch 120 mounted upon the other vertical post 67 extending from the opposite end of the side member 29 from the post 67 upon which the side plate 115 is rotatably and slidably mounted.

The swinging side web 115 extends from one of the side posts 67 to a point just past the center of the side member 29, supporting the bearing member 117 centrally of the side member 29. The web 115 is supported upon one of the vertical end posts 67 of the side member 29 by a cylindrical socket 126 that is secured to the web 115. The cylindrical socket 126 slidably and rotatably interfits about the vertical post 67 and is provided with a lubricant fitting 127 for lubrication thereof. A clamp 128, having a set screw 129 is mounted on the vertical post 67, below the cylindrical socket 126, for height adjustment of the web 115. The height of the web 115 with respect to the rollers 60 and 61 is provided for the same reasons and is maintained in the same manner as has previously been described with respect to the web 93 and clamps 100.

The bearing member 117 comprises a roller bearing 130 that is mounted upon the web 115 in axial alignment with the drive means 88 and supports a drive shaft receiving sleeve 131. The drive shaft 88 preferably is of a rectangular transverse cross section and is slidably removable from its engagement with both the sleeve 110 of the drive means 88 and the sleeve 131 of the bearing 130, so that it may be slidably removed from or inserted into the sleeves. Each of the sleeves 110 and 131 have passageways therethrough of a rectangular shape substantially identical to the drive shaft 89, as does the sleeve 25 of the reel B, and one end 134 of the drive shaft 89 is tapered for facile insertion through the sleeves.

The latch 118 is pivotally secured to the end of the web 115, opposite the cylindrical socket 126, by means of a pivot pin 136. A short length of the uppermost plate of the web 115 is cut away so that the latch can be readily raised and lowered.

The catch 120 is of a substantially U-shaped cross section having the upper end thereof open for receiving the latch 118. The catch 120 is secured upon a cylindrical socket 139 that is slidably mounted upon the vertical end post 67 at the opposite end of side member 29 from the vertical end post 67 upon which the cylindrical socket 126 is mounted. The cylindrical socket 139 is provided with set screws 141 for locking the same in position upon the vertical end post 67. A clamp 143 and set screw 144 may be mounted on the vertical end post 67, beneath the cylindrical socket 139, for the same purposes as the clamp 128 mounted upon the other vertical post 67, however, this is not absolutely necessary as the set screws 141 will be sufficient to maintain the socket 139 in position.

The means G for positioning the reel B preferably includes a height adjustable pivotal supporting member 145; a loading boom 146 secured at one end thereof to the pivotal supporting member 145; a lift boom leg 147 secured at the other end of the loading boom 146; and a reel supporting carriage 148 movably mounted upon the loading boom 146.

The height adjustable pivotal supporting member 145 is mounted upon the web 93 of the side member 28 and preferably includes a flanged plate 151 that is secured to the uppermost surface of the web 93; a cylindrical tube 152 mounted in an upright position upon the flange member 151, and supported thereon by braces 153; a threaded nut 154 rotatably secured to the uppermost end of the tube 152; a threaded shaft 155 having cooperative engagement with the threads of the nut 154 and extending into the cylindrical tube 152; and a clevis 156 providing a pivotal connection for the loading boom 146 mounted at the uppermost end of the threaded shaft 155. This cooperative relationship of elements provides a jack means for raising and lowering the pivoted end of the loading boom 146. The clevis 156 is of a substantially U-shaped construction, having the uppermost end thereof open, with the loading boom 146 pivotally secured intermediate the sides thereof, by means of a pivot pin 160.

The loading boom 146 is preferably a tubular shaft 162 that extends from its interconnection to the pivotal supporting member 145, transversely across the frame C, and substantially therebeyond to its interconnection with the lift boom leg 147. The shaft 162 provides a trackway upon which the carriage 148 moves.

The lift boom leg 147 preferably includes an elongated base plate 164 that supports a vertical tubular anchor post 166. Diagonally extending braces 167 may be secured at one end thereof adjacent the uppermost portion of the anchor post 166, extending diagonally downward therefrom to interconnection with the base plate 164, for maintaining the anchor post 166 in upright position. A loading boom supporting leg 169 is telescopically mounted within the anchor post 166, extending vertically upward therefrom, and is secured at the uppermost end thereof to a loading boom mounting block 170 that is secured to the end of the loading boom opposite the pivotal supporting member 145. Mounted upon one side of the anchor post 166 is a hydraulically operated lift cylinder 172 that is pivotally secured, by means of a pivot pin 173, to the bracket 174 that is mounted upon the anchor post 166. Conduits 175 and 176 are provided leading into the lift cylinder 172 for feeding hydraulic fluid into the cylinder for reciprocation of the piston within the cylinder. Secured to the piston of the lift cylinder 172 is the piston shaft 178 that is provided at its uppermost end with a supporting bracket 180 that is pivotally secured to the mounting block 170 by means of the pivot pin 181.

It will be seen that when pressure is supplied to cylinder 172 through the conduit 175, that the piston shaft 178 will be extended, raising the mounting block 170 and that end of the loading boom 146, causing the shaft 169 to slide telescopically upwardly from the anchor post 166; and that when hydraulic fluid is supplied to the cylinder 172, through the conduit 176, that the piston shaft 178 will be lowered, lowering that end of the loading boom 146, and telescoping the shaft 169 into the anchor post 166. Thus I have provided a reciprocable support for one end of the loading boom 146.

The reel supporting carriage 148 preferably includes a sheave member 190 that is supported upon the trackway 162 and supports a carrying arm 192. The sheave member 190 includes a pair of side carrier plates 194 and 195 that are positioned in a spaced-apart relation by the spacing and reinforcing bars 196. Mounted intermediate the plates 194 and 195 and supported therebetween by a spindle 198 is a roller 200. This roller 200 is positioned to ride on the trackway 162.

Supported between the side plates 194 and 195, at a position below the loading boom arm 162, is the carrying arm 192. This carrying arm 192 preferably includes a longitudinally extending bar member 201 having an opening 202 centrally thereof and having a spacer 203 secured within the opening 201. An attaching bolt 205 passes through the spacer 203 and secures the carrying arm 192 intermediate the side plates 194 and 195. Each end of the bar 201 is provided with an opening 208 that receives and supports clips 210. These clips 210 are pivotally mounted within the openings 208, and are spaced apart a distance substantially equivalent to the width of the reel B, and are adapted to be pivoted beneath the flange 21 of the reel side discs 19 for supporting the reel B for handling.

Any suitable hydraulic system may be used with my apparatus and I show one such system in Fig. 8. This system includes a hydraulic fluid supply tank 215 having disposed therein a filter 216 for filtering the hydraulic fluid as it is withdrawn from the tank; and a conduit 217 for the withdrawal of hydraulic fluid through the filter 216, from the tank 215, the conduit 217 leading to the pump 108 that places the hydraulic fluid under pressure and pumps the fluid through the conduit 219 to a control valve bank 220. The control valve bank 220 includes a control lever 222 for reversible feeding of the hydraulic fluid through the conduits 106 and 107 to the motor 102, and a control lever 224 for reversible feeding of the hydraulic fluid through the conduits 175 and 176 to the cylinder 172; a return conduit 226 being provided for the return of the fluid from the valve bank 220 to the tank 215.

The operation of the apparatus is as follows:

The belt handling apparatus is positioned in the longitudinal path of the belt conveyor for belt removal or addition, and is fixed in position, the loading boom 146 being disposed to either one side or the other of the belt conveyor, as space permits. Now, assuming that a length of belting is to be added to the conveyor, the carriage 148 is moved to the position shown in dot and dash lines in Fig. 3, and the clips 210 secured about the flange 21 of a reel B that is resting on the ground. The hydraulic control lever 224 is now actuated, feeding hydraulic fluid through the conduit 175 to the lowermost portion of the cylinder 172, raising the piston and piston shaft 178, which will raise the loading boom 146, raising the carriage 148 and lifting the reel B off of the ground. The gate 91 of the side member 29 is now opened to the position shown in dot and dash lines in Fig. 3, and the carriage 148, supporting the reel B, is moved to a position between the side members 28 and 29, so that the belting upon the reel is in line with the conveyor belt. The splice 11 of the belt 10 on the conveyor is then opened, the ends of the belting 10 separated, so that the ends of the belting are spaced apart from the frame C; the control lever 224 moved in the opposite direction, feeding the hydraulic fluid through the conduit 176 to the cylinder 172, lowering the piston and piston shaft 178, which, in turn, lowers the loading boom 146 and the reel B carried thereupon to a position so that the peripheral flange 21 of the reel B is supported upon the rollers 60 and 61. The clips 210 are then removed from engagement with the flange 21, and the loading boom slightly raised so that the clips 210 are held spaced from the reel. The outermost end of the belt 26 upon the reel B is then spliced to the forward end of the belt 10, as by a splice 230, and the headpiece or tail piece of the conveyor, as the case may be, it trammed forward, pulling the belting 26 from the reel B. The reel B is thus rotatably supported upon the rollers 60 and 61.

When all of the belting has been removed from the reel, the end of the belting 26 is spliced to the splice 11 of the belting 10, the loading boom 146 lowered so that the clips 210 can be secured to the flange 21 of reel, the gate 91 opened, the loading boom 146 raised so that the reel is free from contact with the rollers 60 and 61, and the reel and carriage moved out of the path of the belt conveyor. The loading boom is then lowered and the reel removed and the apparatus is in position to receive another reel. It is to be noted that various sizes of reels will undoubtedly be used, containing varying lengths of belting, and the jack mounting of the pivotal supporting member 145 is provided so that the pivotal axis of the loading boom 146 may be appropriately raised or lowered for proper engagement of the reel.

When it is desired to remove a length of belting from the conveyor, an empty reel is loaded in line with the conveyor belt, intermediate the side members 28 and 29, in the same manner as was previously described for a loaded reel, the splice of the belt is disconnected, the reel lowered onto the rollers 60 and 61, the gate 91 closed, and the loose end of the belt threaded onto the reel drum 18. The drive shaft 89 is placed through the bearing sleeve 131, through the reel sleeve 25, and into the sleeve 110 of the gear reducer 103. It will be noted that each of the sleeves 131 and 110 are supported for vertical movement so that they may be properly aligned with the axial sleeves of reels of varying dimension. The forward end of the belt conveyor is trammed rearwardly providing slack in the belt, and the control lever 222 is then actuated, feeding hydraulic fluid to the motor 102, providing motive power for the gear reducer 103 which, in turn, rotates the sleeve 110 and the drive shaft 89, rotating the reel B and winding the belting thereupon. After the desired length of belting has been removed, the control lever 222 is then moved into reverse direction, deactivating the motor 102 and gear reducer 103, the drive shaft 89 is removed, the gate 91 opened, the loading boom 146 lowered and the clips 210 moved into engagement with the flange 21 of the reel B, the loading boom 146 raised and the heel removed in the same manner as has been previously described.

Various changes in the shape, size and arrangement of parts may be made to the form of invention herein shown and described, without departing from the spirit of the invention or the scope of the following claims.

I claim:

1. In handling apparatus for belting reels in the insertion and removal of belting in the reach of a belt conveyor, the combination of a reel receiving frame disposed in line with the reach of the belt conveyor, anti-friction reel receiving means mounted upon said frame for supporting the reel for rotary movement in line with the reach of the belt conveyor, track means extending outwardly from said reel receiving frame, and carriage means mounted upon said track means, said carriage means being positioned upon said track means for engagement with said reel and movable along said track means for positioning the reel upon and removing the reel from said reel receiving frame.

2. In belt handling apparatus for manipulating reels of belting for the insertion and removal of belting in a belt conveyor, the combination of a reel receiving frame, said reel receiving frame including anti-friction reel receiving means for supporting the reel for rotary movement, track means extending outwardly from said reel receiving frame, and carriage means mounted upon said track means, said carriage means being positioned upon said track means for engagement with said reel and movable along said track means for positioning the reel upon and removing the reel from said reel receiving frame.

3. In a belt conveyor of the type having a head section and a tail section, with side supports for the conveyor extending longitudinally of and to each side of the belt; a belt reel handling apparatus for the insertion and removal of belting intermediate the head and tail section of the belt conveyor including a reel receiving frame disposed in line with the reach of the belt conveyor and extending intermediate the side supports, reel receiving means mounted upon said frame for supporting the reel for rotary movement in line with the reach of the belt conveyor, means to enable the positioning of the reel upon and removal of the reel from said reel receiving frame, and side support attaching means mounted upon said reel receiving frame securing said frame to said side supports for maintaining said reel receiving frame in proper alignment with the reach of the belt conveyor.

4. In a belt conveyor of the type having a head section and a tail section, with the conveying reach thereof supported upon idler rollers that are in turn supported upon spaced flexible strands; a belt reel handling apparatus for the insertion and removal of belting intermediate the head and tail section of the belt conveyor including a reel receiving frame disposed in line with the reach of the belt conveyor, said frame being positioned intermediate the spaced flexible strands and staddling the return reach of the belt conveyor, reel receiving means mounted upon said frame for supporting the reel for rotary movement in line with the reach of the belt conveyor, means to enable the positioning of the reel upon and removal of the reel from said reel receiving frame, strand receiving guides mounted upon said frame for aligning said reel receiving frame in line with the reach of the belt conveyor and for training the strands about said reel receiving frame so that the reel will not strike against the strands as the reel is positioned upon and removed from said reel receiving frame, and idler rollers mounted upon said reel receiving frame for supporting the return reach of the belt conveyor as it passes through said reel receiving frame.

5. In a belt conveyor of the type having a head section and a tail section, with the conveying reach thereof supported upon idler rollers that are in turn supported upon spaced flexible strands; a belt reel handling apparatus for the insertion and removal of belting intermediate the head and tail section of the belt conveyor including a reel receiving frame disposed in line with the reach of the belt conveyor and extending intermediate the spaced flexible strands, reel receiving means mounted upon said frame for supporting the reel for rotary movement in line with the reach of the belt conveyor, means to enable the positioning of the reel upon and removal of the reel from said reel receiving frame, and strand receiving guides mounted upon said frame for aligning said reel receiving frame in line with the reach of the belt conveyor and for training the strands about said reel receiving frame so that the reel will not strike against the strands as the reel is positioned upon and removed from said reel receiving frame.

6. The combination as specified in claim 5 wherein the strands are secured within said strand receiving guides and said reel receiving frame forms a supporting standard for the strands.

7. In handling apparatus for belting reels in the insertion and removal of belting in the reach of a belt conveyor; the combination of a reel receiving frame disposed in line with the reach of the belt conveyor; reel receiving means mounted upon said frame for supporting the reel for rotary movement in line with the reach of the belt conveyor; and means to enable the positioning of the reel upon and removal of the reel from said reel receiving frame; said last mentioned means including a supporting leg spaced from said reel receiving frame, an elongated boom supported at one end thereof upon said reel receiving frame and at the other end thereof upon said supporting leg, and a reel supporting carriage movably mounted upon said elongated boom.

8. The combination as specified in claim 7 wherein said elongated boom is supported in a height adjustable relationship upon said reel receiving frame and said supporting leg so that reels of various diameters may be properly positioned upon and removed from said reel receiving frame.

9. The combination as specified in claim 7 wherein said elongated boom is pivotally supported upon said reel receiving frame and said supporting leg includes lift means for raising and lowering the end of said elongated boom supported thereby.

10. The combination as specified in claim 9 wherein said supporting leg includes an extensible anchor post having telescoping sections, one end section of said anchor post being ground supported and the end section of said anchor post at the opposite end thereof from said last mentioned end section being secured to one end of said elongated boom, and said lift means is secured at one end thereof to the section of said anchor post that is ground supported and at the other end thereof to said elongated boom adjacent the end section of said anchor post secured to one end of said elongated boom.

11. The combination as specified in claim 7 wherein said elongated boom defines a trackway upon which said reel supporting carriage is movable and said reel supporting carriage includes a sheave member mounted upon said elongated boom, an elongated reel carrying arm supported by said sheave member below said elongated boom, and a pair of reel engaging slips mounted adjacent each end of said reel carrying arm.

12. In belt handling apparatus for manipulating reels of belting for the insertion and removal of belting in a belt conveyor, the combination of a reel receiving frame, said reel receiving frame including reel receiving means for supporting the reel for rotary movement and a pair of side brackets for limiting sideway shifting of the reel and maintaining the reel in position upon said reel receiving means, track means extending from said reel receiving frame for positioning the reel intermediate said side brackets, and means mounted upon said track means and positioned for engagement with said reel to enable movement of said reel along said track means.

13. In belt handling apparatus for manipulating reels of belting for the insertion and removal of belting in a belt conveyor, the combination of a reel receiving frame, said reel receiving frame including reel receiving means for supporting the reel for rotary movement, a pair of side brackets secured to said reel receiving frame and positioned to receive the reel therebetween, drive means mounted upon one of said side brackets, a reel engaging and rotating means supported by said side brackets and operably connected to said drive means, track means extending outwardly from one of said side brackets, and carriage means mounted upon said track means, said carriage means being positioned upon said track means for engagement with said reel and movable along said track means for positioning the reel upon and removing the reel from intermediate said side brackets.

14. The combination as specified in claim 13 wherein each of said side brackets are vertically movably supported upon said reel receiving frame and said drive means supported by one of said side brackets and said reel engaging and rotating means is supported by both of said side brackets for vertical adjustable movement in accordance with the movement of said side brackets so that reels of various diameters may be engaged and rotated thereby.

15. The combination as specified in claim 13 wherein said side bracket from which said track means outwardly extends is hingedly mounted upon said frame so that one end of said side bracket may be swung away from said reel receiving frame, providing an opening through which the reel may be positioned and removed from the reel receiving frame.

References Cited in the file of this patent
UNITED STATES PATENTS

| | | |
|---|---|---|
| 1,956,398 | Nullmeyer | Apr. 24, 1934 |
| 2,616,636 | Aden | Nov. 4, 1952 |
| 2,706,056 | Talley et al. | Apr. 12, 1955 |
| 2,846,051 | Craggs et al. | Aug. 5, 1958 |

UNITED STATES PATENT OFFICE

CERTIFICATE OF CORRECTION

Patent No. 2,933,177                                      April 19, 1960

John B. Long

It is hereby certified that error appears in the printed specification of the above numbered patent requiring correction and that the said Letters Patent should read as corrected below.

Column 5, line 70, for "shft" read -- shaft --; column 7, line 32, for "it" read -- is --; column 8, line 1, for "heel" read -- reel --; line 56, for "staddling" read -- straddling --; column 10, line 4, for "slips" read -- clips --.

Signed and sealed this 27th day of September 1960.

(SEAL)
Attest:

KARL H. AXLINE                                                ROBERT C. WATSON

Attesting Officer                                           Commissioner of Patents